(12) United States Patent
Pfandl

(10) Patent No.: US 10,518,335 B2
(45) Date of Patent: Dec. 31, 2019

(54) DEVICE FOR HOLDING A WORKPIECE

(71) Applicant: Aktiebolaget SKF, Gothenburg (SE)

(72) Inventor: Erich Pfandl, Zeltweg (AT)

(73) Assignee: AKTIEBOLAGET SKF, Gothenburg (SE)

( * ) Notice: Subject to any disclaimer, the term of this patent is extended or adjusted under 35 U.S.C. 154(b) by 71 days.

(21) Appl. No.: 15/289,302

(22) Filed: Oct. 10, 2016

(65) Prior Publication Data

US 2018/0099336 A1 Apr. 12, 2018

(51) Int. Cl.
B23B 31/16 (2006.01)

(52) U.S. Cl.
CPC .............................. B23B 31/16275 (2013.01)

(58) Field of Classification Search
CPC ............................................... B23B 31/16275
See application file for complete search history.

(56) References Cited

U.S. PATENT DOCUMENTS

| 5,464,231 A * | 11/1995 | Clay | ............... B23B 31/16012 269/268 |
| 2014/0125015 A1 | 5/2014 | Choi et al. | |
| 2014/0125016 A1 | 5/2014 | Stafford | |

FOREIGN PATENT DOCUMENTS

| CH | 417276 A | 7/1966 |
| CN | 202129649 U | 2/2012 |
| CN | 203738052 U | 7/2014 |
| DE | 829394 C | 1/1952 |
| DE | 19756112 A1 | 6/1999 |
| EP | 2759361 A1 | 7/2014 |
| KR | 20140001865 U | 4/2014 |

* cited by examiner

Primary Examiner — John C Hong
(74) Attorney, Agent, or Firm — Garcia-Zamor Intellectual Property Law, LLC; Ruy Garcia-Zamor; Bryan Peckjian

(57) ABSTRACT

A device for holding a workpiece that includes a first clamping element and at least one second clamping element, wherein the first clamping element and the second clamping element each include on an end side extending in a radial plane a first engagement structure and at least one second engagement structure at different radial positions configured to engage at a first time an end side of a first workpiece having a first diameter and at a second time an end surface of a second workpiece of a second diameter different than the first diameter for holding the workpiece by moving the first clamping element and the second clamping element in the radial direction.

12 Claims, 5 Drawing Sheets

DEVICE FOR HOLDING A WORKPIECE

TECHNOLOGICAL FIELD

The present disclosure is directed to a device for holding workpieces, for example, for rotary marching, that vary significantly in size and to a method for holding either a first workpiece or a second workpiece when the workpieces vary significantly in size.

BACKGROUND

Certain products, such as, for example, seals, can be produced from plastic workpieces by rotary machining on a lathe. The plastic workpieces here can be, for example, so-called semi-finished products, i.e., prefabricated objects. For example a semi-finished product can be a (thick-walled) plastic tube, which can be used for cutting out or cutting off of seal rings by rotary machining (i.e., processing during a rotating of the semi-finished product). During a rotary machining the semi-finished product, or generally speaking the workpiece, must be fixed. For this purpose clamping jaws are conventionally used in a jaw chuck. Here a plurality of clamping jaws are moved radially inward in order to radially contact an outer surface of the semi-finished product, e.g., a cylindrical outer surface, on a plurality of sides and to fix by clamping. Depending on the diameter of the semi-finished product, different jaw sizes must conventionally be used. When semi-finished products of various sizes must be processed, then after removal of the first semi-finished product, whose processing is to be ended, the associated clamping jaws are also removed from the lathe. Thereafter clamping jaws adapted according to the size of the second semi-finished product must be inserted into the lathe, and only thereafter can the second semi-finished product be fixed for the further processing by moving the further clamping jaws relative to one another. For example, for a diameter of approximately 30 mm to 400 mm of the semi-finished product, to date up to 18 clamping-jaw sets have been used. Here a clamping jaw set is comprised of three identical jaws that are each configured to contact an outer surface of the semi-finished product, e.g., a cylindrical outer surface, and to exert a pressing force in order to fix the semi-finished product.

SUMMARY

It has been observed that previous methods for holding a workpiece or in particular a semi-finished product required a relatively large number of clamping-jaw sets of different sizes, which thus made a rotary machining device or a rotary machining method very complex and costly. It is thus an aspect of the present disclosure to provide a device for holding a workpiece, in particular a semi-finished product, in particular for rotary machining, which has a high flexibility for holding differently sized workpieces and has a lower complexity compared to the prior art. Furthermore it is an aspect of the present disclosure to provide a method for holding differently sized workpieces or semi-finished products, which is simplified compared to conventional methods, provides a time savings, and thus increases throughput.

According to one embodiment of the present disclosure a device for holding (in particular fixing for rotary machining) a workpiece (in particular a semi-finished product, in particular a cylindrical semi-finished product, in particular a thick-walled plastic tube) is provided. Here the device includes a first clamping element (which includes a contact surface for transmitting a pressing force to a part of the workpiece) and at least one second clamping element (in particular exactly three clamping elements or four clamping elements or more than four clamping elements). Here the first clamping element and the second clamping element each include, on an end side extending in a radial plane, a first engagement structure and at least one second engagement structure (or a plurality of second engagement structures) at different radial positions. With the first or the second engagement structure an end of a workpiece (in particular of a semi-finished product) of at least two different sizes can be brought into engagement by moving toward each other the first clamping element and the second clamping element in the radial direction for holding.

For this purpose the first engagement structure and the at least one second engagement structure can be particularly structured or profiled in order to ensure a stable bringing-into-engagement and thus holding of the workpiece. The first clamping element and the second clamping element can move towards each other in the radial direction along a guide groove or guide rail on a back side of the respective clamping element. The moving toward each other of the clamping elements (in particular three clamping elements) can occur in a synchronous manner so that the movements occur simultaneously and with the same speed. The first clamping element and the second clamping element can comprise, for example, circle segments, e.g., a circle segment of 90° or a circle segment of 120°. On the respective end the clamping elements can include a plurality of engagement structures, which can be used for being in engagement with workpieces of various sizes. The end side of the clamping elements here can be profiled, and a rear side of the clamping elements here can include a groove or a guide rail for moving of the clamping elements in the radial direction relative to one another.

The clamping elements can be produced from metal, in particular from aluminum, in particular by turning and/or milling. The different radial positions are measured in the radial direction, and the radial planes can be defined by a plurality of radial directions that lie at the same axial position. Notably, the disclosed engagement structures are not configured to engage an outside surface of the workpiece, in particular not with a cylindrical outer surface of a tube, but with a suitably structured end side of the workpiece or, alternately, with a suitably structured adapter on the end side of the workpiece. The adapter can include structures complementary to the respective engagement structure. The different sizes of the workpieces can be defined, for example, by different diameters of the workpiece. The diameter of the various workpieces fixable by the device can differ here by a factor of 5 to 15, in particular 8 to 12, in particular approximately 10. The number of required clamping-jaw sets can thereby be reduced to a (single) clamping-jaw set, namely one first and at least one second clamping element (which can also be referred to as a first clamping jaw and at least one second clamping jaw). The clamping elements or jaws can remain mounted on a jaw chuck, even if after processing a first workpiece of a first size, subsequently a second workpiece of a second size, which, for example, is five times to ten times larger than the size of the first workpiece, is to be processed. Furthermore the costs for the holding means or clamping means can decrease because now only one clamping-jaw set, i.e., a first clamping element and at least one second clamping element, is required. Furthermore the piece costs in ongoing operation can decrease since the time for jaw exchange is saved. Thus a higher throughput of the rotary machining can be achieved.

According to one embodiment of the present disclosure only a single clamping-jaw set is used for a variety of differently sized workpieces. Here both the clamping jaws and the semi-finished product can be provided with grooves and/or projections. The dimensions of the grooves of clamping jaws and semi-finished product here can be coordinated with each other. In particular the profiles or structures of the clamping jaws and those on the end side and of an adapter on the semi-finished product can be complementary to each other. The grooves in the semi-finished product, can, for example, be produced by turning and/or milling. Alternatively the semi-finished product can be provided with a plastic adapter on an end side and the plastic adapter can either already have grooves or the grooves can be introduced without additional costs on the already attached semi-finished product. For holding or clamping the semi-finished product or workpiece the three clamping jaws (i.e., for example, the first clamping element and the at least one second clamping element) can be moved inward, whereby the semi-finished product is clamped-in.

The first engagement structure can comprise a first raised (protruding from a radial plane) circular ring segment (e.g. 90°- or 120°-circular ring segment, possibly with interruptions for any attachment screws), and the second engagement structure can comprise a second raised circular ring segment, so that in particular a groove (or recess or furrow) is formed between the first and the second circular ring segment. A complementary structure, for example, which is present on the end side of the semi-finished product or on an adapter connected thereto, can be brought into engagement in the groove or recess. A circular ring segment can easily be produced by milling along a circumferential direction. Furthermore, a circular ring segment can make possible a stable holding.

A radially inwardly directed engagement contact surface (with which the respective circular ring segment can be in contact with a complementary structure of the semi-finished product or of the adapter) of the first and/or of the second circular ring segment can be inclined relative to a normal (a perpendicular) of the radial plane by an inner inclination angle so that the respective circular ring segment projects radially inward. Thus a particularly tight fit of the workpiece can be achieved by clamping. Furthermore, a releasing of the workpiece can be facilitated since the workpiece can easily fall out from the respective engagement structures by a moving radially outward of the clamping elements. Thus the clamping or releasing of a workpiece can be simplified and improved.

A radially outwardly oriented surface of the first and/or of the second circular ring segment can be inclined relative to a normal of the radial plane by the (same) inner inclination angle so that the radially inwardly directed engagement contact surface is oriented essentially parallel to the radially outwardly directed surface of the respective circular ring segment. A releasing of the workpiece (in particular with attached adapter) can thereby be facilitated. Furthermore the production of the circular ring segments or of the grooves therebetween can be achieved in a simple manner, for example, by milling.

The device can further include an adapter, which in particular can be produced from plastic, which is attachable to an end side of the workpiece, in particular using friction welding (a rotating relative to each other so that heat is generated which eventually causes a welding of plastic), wherein the adapter includes at least one projection (or a plurality of projections, in particular also circular ring segments, which are complementary to the grooves of the clamping element). The first or the second engagement structure (depending on the size of the workpiece) can be brought into engagement with the projection or with the plurality of projections. The adapter can be attached to the workpiece in a simple manner and can ensure a stable fit or hold after clamping of the clamping elements.

A radially inwardly directed engagement contact surface of the circular ring segment can form a sharp edge with the axially directed end side of the circular ring segment, wherein the sharp edge can be brought into engagement with the adapter groove base of the adapter attached to the workpiece. The sharp edge can, for example, deform a plastic of the adapter after or due to a radial moving of the clamping elements toward each other, which can generate a stable fit and a stable hold.

A plurality of engagement structures equally radially spaced on each clamping element can be available and can in particular be brought into engagement with a plurality of projections of a respective adapter of workpieces of different sizes. Thus a holding of a plurality of workpieces of different sizes can be supported. A depth of the groove (in the axial direction perpendicular to the radial direction) can be between 0.8 and 1.2, in particular 0.9 and 1.1, times a radial extension of the groove. The depth can in particular be between 3 mm and 5 mm. A radial extension of the circular ring segment can be between 0.8 and 1.2, in particular between 0.9 and 1.1, times a radial extension of the ring. Here the radial extension of the circular ring segment can in particular be between 3 mm and 5 mm.

The clamping element (in particular each clamping element) can be produced, for example, from aluminum, and the first and the second engagement structure (or all engagement structures) can be carved out or formed by turning and milling. The first clamping element can have, for example, a radius of curvature of between 10 mm and 20 mm, in particular between 13 mm and 17 mm, and the second clamping element can have a radius of curvature of between 100 mm and 300 mm, in particular between 150 mm and 250 mm. Thus workpieces of different sizes, which differ, for example, by a factor of 10 in size, can be held securely.

According to one embodiment of the present disclosure a method for holding a first and a second workpiece is further provided, wherein the workpieces can be held for rotary machining, for example, on a lathe. The method includes placing the first workpiece onto a first clamping element and a second clamping element, moving the first clamping element and the second clamping element towards each other in the radial direction, bringing into engagement each of a first engagement structure of the first clamping element and of the second clamping element with a first adapter attached on an end side of the first workpiece, which engagement structures are disposed on an end side extending in a radial plane, releasing the first workpiece by moving apart the first clamping element and the second clamping element in the radial direction, placing the second workpiece, which has at least double, three times, four times, five times, six times, seven times, eight times, nine times, or ten times as large a diameter as the first workpiece, onto the first clamping element and the second clamping element, moving the first clamping element and the second clamping element towards each other, bringing into engagement each of a second engagement structure of the first clamping element and of the second clamping element with a second adapter attached on an end side of the second workpiece, which engagement structures are disposed an end side extending in a radial plane.

In particular a total of three clamping elements (also referred to as clamping jaws) can be used, or a total of exactly four clamping elements can be used. In the method the clamping elements need not be changed in order to successively hold the first and thereafter the second workpiece. Only the first workpiece and the second workpiece need to each be prepared before the holding process so that their end side includes a suitable profiling or so that a suitable adapter is attached to the end side. Compared to a conventional method, a changing of workpieces of different sizes is accelerated since the clamping elements or clamping jaws need not be changed.

Embodiments of the present invention will now be explained with reference to the accompanying drawings. The invention is not limited to the illustrated or described embodiments.

DETAILED DESCRIPTION

Figure 1A:
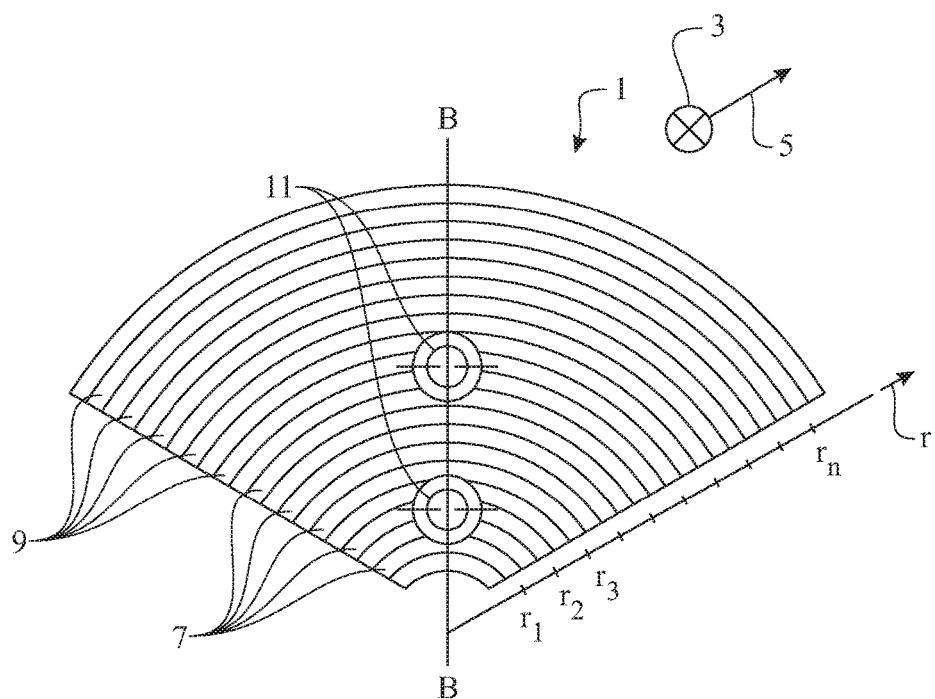
FIG. 1A schematically shows an end side view of a clamping element according to an embodiment of the present disclosure.

FIG. 1A illustrates a clamping element 1 of a device for holding a workpiece according to an embodiment of the present disclosure, along an axial direction 3, corresponding to an end view, wherein the axial direction 3 is perpendicular to a radial direction 5. Thus in FIG. 1A the end side of the clamping element 1 is illustrated. On the end side extending in the radial plane the clamping element 1 includes at least one engagement structure 7 and at least one second engagement structure 9 at different radial positions r1, r2, r3, . . . rn. With these engagement structures an end side of a workpiece, or an adapter attached to the end side of the workpiece, can be brought into engagement when the clamping element 1 together with two other clamping elements (see, for example, FIG. 3) are moved radially inward toward one another.

The clamping element 1 further includes two through-holes 11, which can be used for attaching the clamping element 1, for example, to a guide rail. In the example of FIG. 1A the radius of the clamping element 1 is 100 mm. However, the radius can also be larger, for example, 200 mm or 150 mm or 300 mm. Depending on the sizes of workpieces which are to be held using the clamping element 1, the radius can be correspondingly adapted.

Figures 1B, 1C:
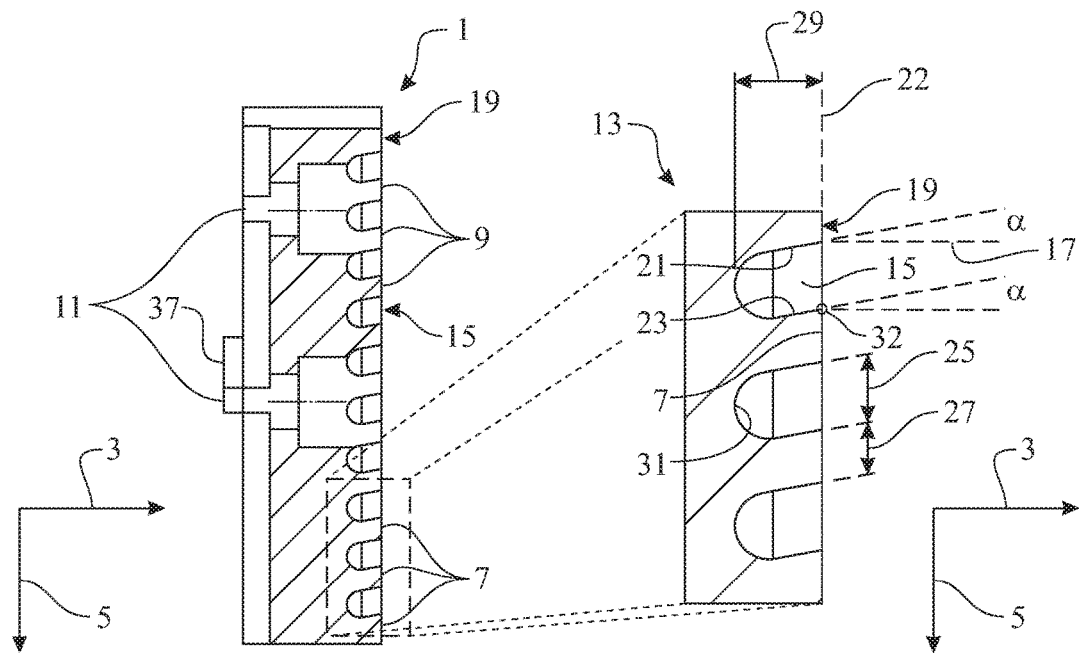
FIG. 1B schematically illustrates a side view along the line B-B in FIG. 1A of the clamping element according to an embodiment of the present disclosure.
FIG. 1C illustrates a detailed view of FIG. 1B.

FIG. 1B is a side view of the clamping element 1 of FIG. 1A along the line B-B. Here it can be seen that the engagement structures 7 and 9 each forms circular ring segments, which are raised, so that they project in a tooth-shaped manner. As can be seen in the detail view 13 in FIG. 1C, a groove 15 is formed between the circular ring segments 7, 9, at which material has been removed. The groove 15 is inclined by an inner inclination angle α with respect to a normal 17 of the end side 19 of the clamping element 1. In particular a radially inwardly directed engagement contact surface 21 of the circular ring segment 9 is inclined by the inner inclination angle α relative to the normal 17 of the radial plane 22. Likewise a radially outwardly directed surface 23 is inclined by the inner inclination angle α relative to the normal 17 of the radial plane 22. Thus the radially inwardly directed engagement contact surface 21 of a circular ring segment 7, 9 is essentially parallel to the radially outwardly directed surface 23 of an adjacent circular ring segment 7, 9.

In the example depicted a radial extension 25 of the groove 15 is 4.47 mm, but in other embodiments it can assume other values. A radial extension of the end surface of the circular ring segment 7, 9 is indicated by reference number 27 and can essentially correspond to or be equal to the radial extension 25 of the groove 15. A depth of the groove is indicated by reference number 29 and can be, for example, 1.0 to 1.5 times the radial extension 25 of the groove 15. In the illustrated embodiment the groove 15 has a base or floor 31, which is semicircular in the cross-section illustrated in FIG. 1C. Such a groove can be easily produced by milling.

In FIG. 1C a sharp edge 32 can also be seen, which is formed between the radially inwardly directed engagement contact surface 21 and the end surface 19 of a circular ring segment 7 or 9 or between the radially outwardly directed engagement surface 23 and the end surface 19 of a circular ring segment 7 or 9.

Figure 1D:
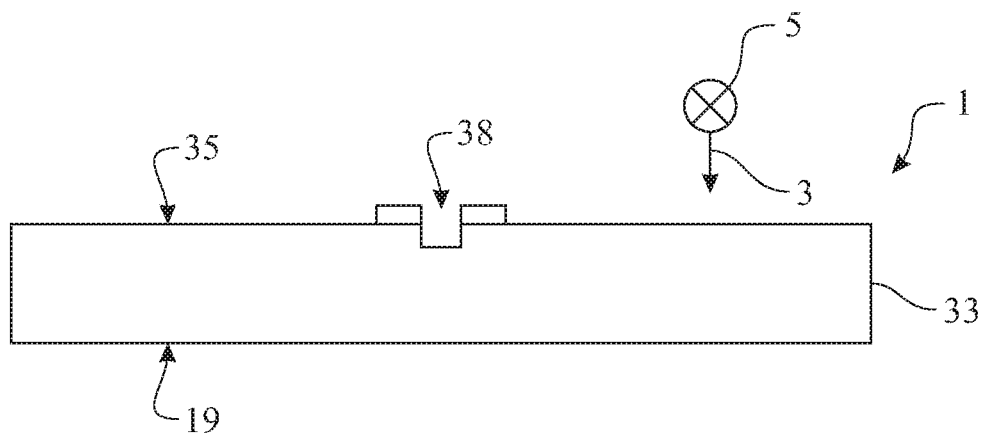
FIG. 1D illustrates a plan view of the clamping element illustrated in FIG. 1A.

FIG. 1D illustrates the clamping element 1 illustrated in FIG. 1A in a plan view, from which a thickness 33 of, e.g., approximately 23 to 25 mm results. On the end side 19 the circular ring segments 7, 9 are disposed and on the back side 35 a guide groove 38 is incorporated in a central region in order to be able to move the clamping element 1 in the radial direction 5 for clamping a workpiece.

Figure 1E:
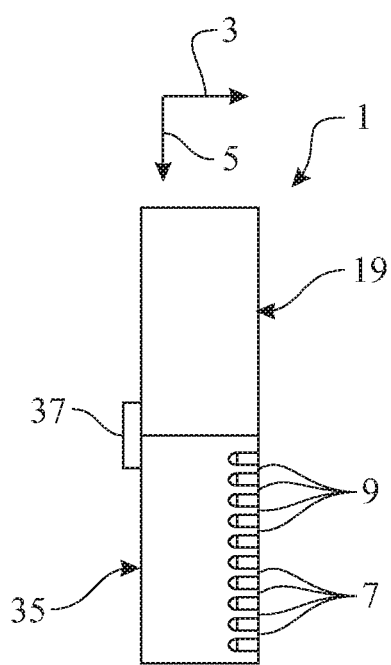
FIG. 1E illustrates a further side view of the clamping element illustrated in FIG. 1A.
Figure 1F:
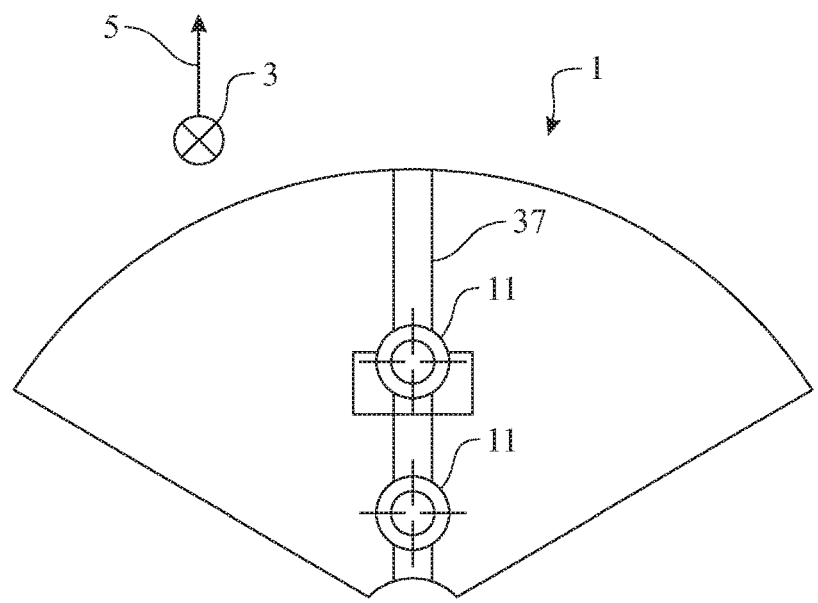
FIG. 1F illustrates a rear view of the clamping element illustrated in FIG. 1A.

FIG. 1E is a further side view of the clamping element 1 and furthermore allows a guide rail 37 to be seen on the back side 35. FIG. 1F illustrates a rear view of the clamping element 1 illustrated in FIG. 1A in end view, wherein the through holes 11, used as attachment openings, and the guide rails 37 can be seen, which extend along the radial direction 5.

Figure 2:
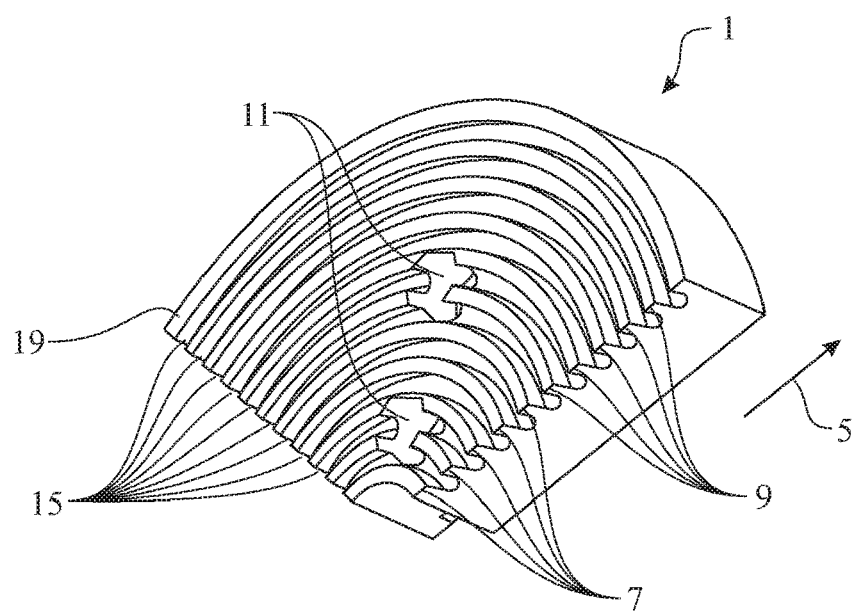
FIG. 2 illustrates a schematic perspective view of the clamping element illustrated in FIG. 1A, wherein the end side is shown.

FIG. 2 illustrates in a schematic perspective depiction the clamping element 1, wherein the end side 19 with the circular ring segments 7, 9 is substantially recognizable. The circular ring segments 7, 9 each forms a segment of 120° and are partially interrupted due to the existing attachment through-holes 11. The circular ring segments 7, 9 are identically spaced from one another in the radial direction 5. In other embodiments the circular ring segments can be irregularly distributed, wherein, for example, certain radial regions of the clamping element remain unprofiled.

Figure 3:
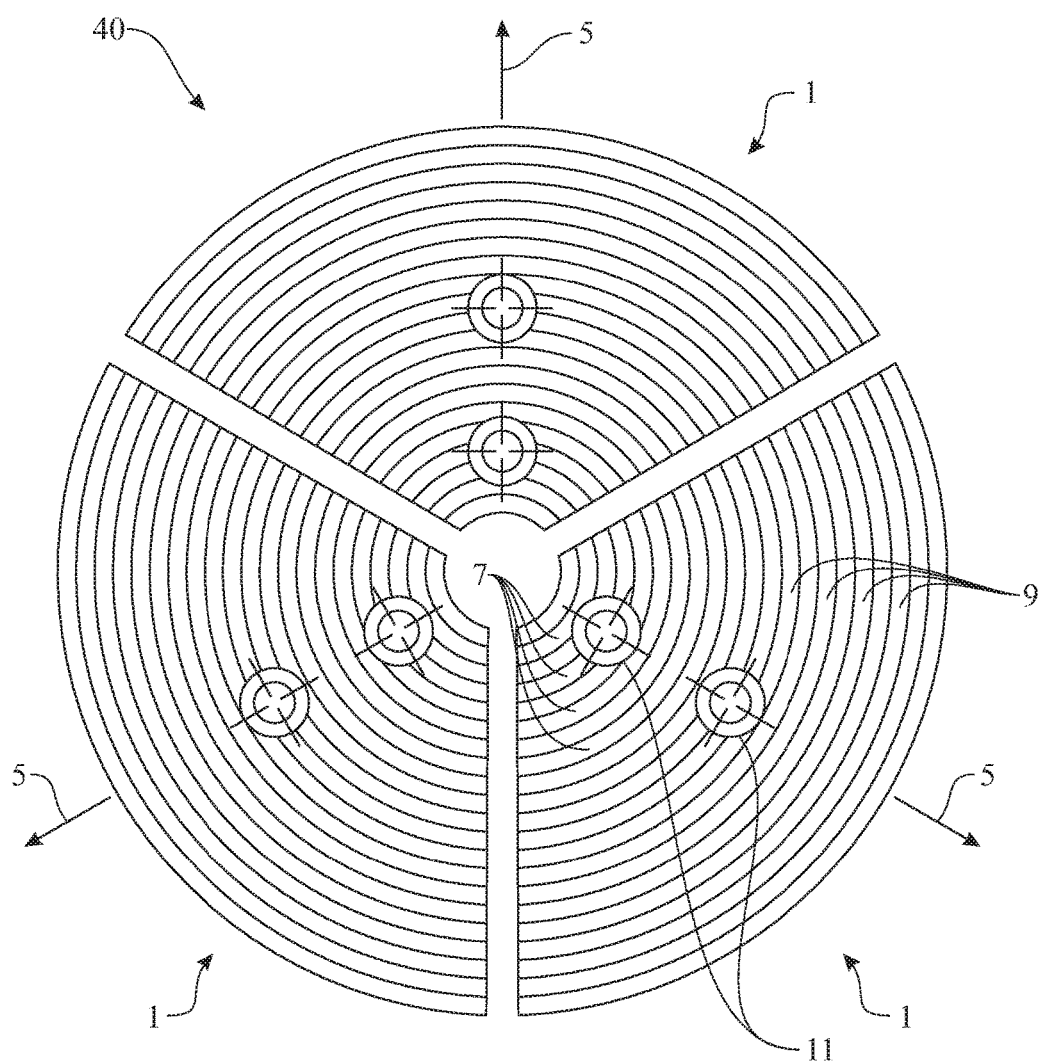
FIG. 3 illustrates a clamping element set comprised of three clamping elements, as is illustrated in FIG. 1A, in a side view.

FIG. 3 illustrates a clamping-element set or clamping-jaw set 40 with three clamping elements 1, as are illustrated in FIGS. 1A to 1F and 2. In a device for holding a workpiece these three clamping elements 1 are movable toward each other and movable away from each other along the radial directions 5 in order to hold a workpiece or release the workpiece.

The three clamping elements 1 illustrated in FIG. 3 can, for example, be produced together in the arrangement and orientation as shown in order to produce the circular ring segments 7, 9 and the grooves 15. For this purpose the three clamping elements 1 would only need to be fixed with the help of the attachment through-holes in this arrangement and orientation as drawn and shown and, for example, milled in this position.

Figure 4:
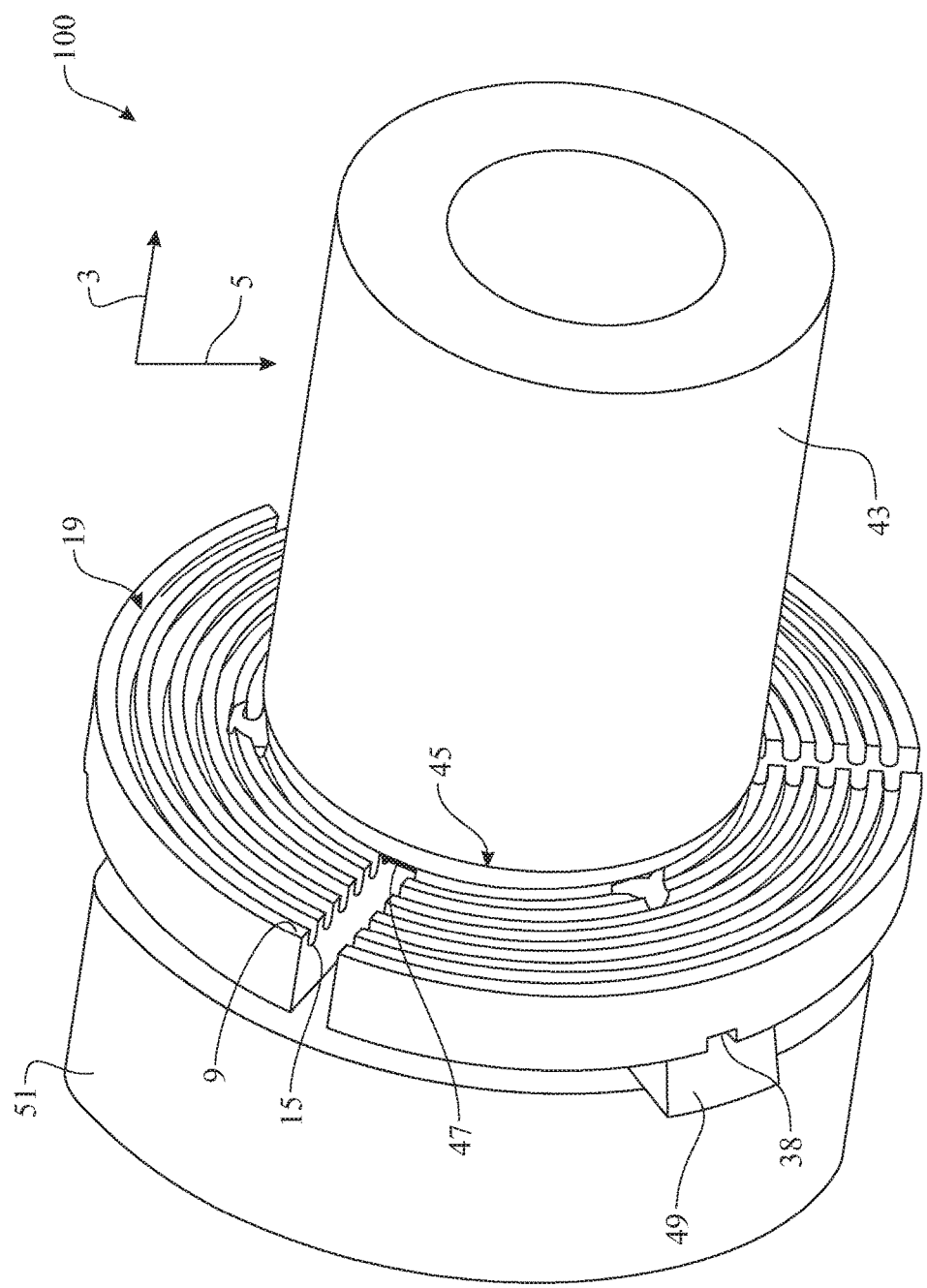
FIG. 4 illustrates a device for holding a workpiece according to an embodiment of the present disclosure, which carries out a method step of a method for holding various work pieces according to embodiments of the disclosure.

FIG. 4 shows in a schematic perspective depiction a part of a device 100 for holding a workpiece 43 according to an embodiment of the present disclosure. The depiction in FIG. 4 is a perspective sectional depiction obliquely between an axial direction 3 and a radial direction 5. The workpiece 43 is a semi-finished product, in particular a thick-walled cylindrical plastic tube, and an adapter 45 is attached to an end side of the tube, which adapter includes projections 47. The projections 47 are in engagement with circular ring segments 9 of the clamping element 1. A workpiece of smaller extension, including a suitably profiled end surface or attached to a smaller adapter, can be brought into engagement with the circular ring segments 7, after which, for example, the processing of the workpiece 43 illustrated in FIG. 4 is ended.

A device 49 can be provided, for example, for radial moving of the clamping element 1 in radial direction 5. Reference number 51 indicates a manual chuck. The clamping element 1 (also referred to as aluminum jaws) can, for example, be produced from aluminum and processed by milling and turning so as to produce the circular ring segments 7 and 9 as well as the grooves 15.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved devices for holding a workpiece.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

| Ref. No. | Description |
| --- | --- |
| 1 | Clamping element (clamping jaws) |
| 3 | Axial direction |
| 5 | Radial direction |
| 7 | Circular ring segment or engagement structure with small radius |
| 9 | Circular ring structure or engagement structure with large radius |
| 11 | Through-holes |
| 13 | Detail view |
| 15 | Groove |
| 19 | End surface |
| 21 | Radially inwardly directed engagement contact surface |
| 22 | Radial plane |
| 23 | Radially outwardly directed surface |
| 25 | Radial extension of the groove |
| 27 | Radial extension of the circular ring segment |
| 29 | Depth of the grooves |
| 31 | Groove base |
| 32 | Sharp edge |
| 35 | Back side of the guide groove |
| 37 | Guide-rail |
| 38 | Guide-groove |
| 40 | Clamping-element set or clamping-jaw set |
| 43 | Semi-finished product |
| 45 | Adapter |
| 47 | Projection |
| 49, 51 | Manual jaw chuck |
| r1, r2 r3, . . . rn | Radial positions |
| α | Inner inclination angle |

What is claimed is:

1. A device for holding a workpiece, comprising:
   a first clamping element; and
   at least one second clamping element,
   wherein the first clamping element and the second clamping element each include on an end side extending in a radial plane a first engagement structure and at least one second engagement structure at different radial positions configured to engage at a first time an end side of a first workpiece having a first diameter and at a second time an end surface of a second workpiece of a second diameter different than the first diameter to hold one of the first workpiece or the second workpiece by moving the first clamping element towards the second clamping element in the radial direction,
   wherein the first engagement structure comprises a first raised circular ring segment and the second engagement structure comprises a second raised circular ring segment and a groove between a first circular ring segment and a second circular ring segment.

2. The device according to claim 1, having an arrangement of at least one of:
   wherein a depth of the groove is between 0.8 and 1.2, times a radial extension of the groove and is between 3 mm and 5 mm, and
   wherein a radial extension of the circular ring segment is between 0.8 and 1.2, times a radial extension of the groove, and the radial extension of the circular ring segment is between 3 mm and 5 mm.

3. The device according to claim 1,
   wherein a radially inwardly directed engagement contact surface of at least one of the first circular ring segment and the second circular ring segment is inclined relative to a normal of the radial plane by an inner inclination angle (α) so that the first circular ring segment and/or the second circular ring segment projects radially inward, wherein a radially outwardly directed surface of the first circular ring segment and/or of the second circular ring segment is inclined relative to the normal of the radial plane by the inner inclination angle (α), so that the radially inwardly directed engagement contact surface is substantially parallel to the radially outwardly directed surface of the respective circular ring segment, further including an adapter attached to an end side of the workpiece, wherein the adapter includes at least one projection configured to be engaged by the first or the second engagement structure, wherein the radially inwardly directed engagement contact surface forms a sharp edge with the axially directed end side of the circular ring segment, and wherein the sharp edge is configured to engage an adapter groove base of the adapter attached to the workpiece, wherein a depth of the groove is between 0.8 and 1.2, times a radial extension of the groove and is between 3 mm and 5 mm, wherein a radial extension of the circular ring segment is between 0.8 and 1.2, times a radial extension of the groove, and the radial extension of the circular ring segment is between 3 mm and 5 mm, and wherein the first circular ring segment has radius of curvature of between 10 mm and 20 mm, and the second circular ring segment has a radius of curvature of between 100 mm and 300 mm.

4. A device for holding a workpiece, comprising:
a first clamping element; and
at least one second clamping element,
wherein the first clamping element and the second clamping element each include on an end side extending in a radial plane a first engagement structure and at least one second engagement structure at different radial positions configured to engage at a first time an end side of a first workpiece having a first diameter and at a second time an end surface of a second workpiece of a second diameter different than the first diameter to hold the first workpiece or the second workpiece by moving the first clamping element towards the second clamping element in the radial direction,
wherein a radially inwardly directed engagement contact surface of at least one of a first circular ring segment and a second circular ring segment is inclined relative to a normal of the radial plane by an inner inclination angle (α) so that the at least one of the first circular ring segment and the second circular ring segment projects radially inward.

5. The device according to claim 4, wherein a radially outwardly directed surface of at least one of the first circular ring segment and of the second circular ring segment is inclined relative to the normal of the radial plane by the inner inclination angle (α), so that the radially inwardly directed engagement contact surface is substantially parallel to the radially outwardly directed surface of the respective circular ring segment.

6. The device according to claim 4, further including:
an adapter attached to an end side of the workpiece,
wherein the adapter includes at least one projection configured to be engaged by one of the first engagement structure or the second engagement structure.

7. The device according to claim 6, further comprising a radially inwardly directed engagement contact surface, wherein the radially inwardly directed engagement contact surface forms a sharp edge with the axially directed end side of the circular ring segment, and wherein the sharp edge is configured to engage an adapter groove base of the adapter attached to the workpiece.

8. A device for holding a workpiece, comprising:
a first clamping element; and
at least one second clamping element,
wherein the first clamping element and the second clamping element each include on an end side extending in a radial plane a first engagement structure and at least one second engagement structure at different radial positions configured to engage at a first time an end side of a first workpiece having a first diameter and at a second time an end surface of a second workpiece of a second diameter different than the first diameter to hold the first workpiece or the second workpiece by moving the first clamping element towards the second clamping element in the radial direction,
the device having at least one of the following arrangements:
a) including a plurality of additional engagement structures equally radially spaced and configured to be brought into engagement with a plurality of projections of an adapter of workpieces of different sizes,
b) wherein the first clamping element is produced from aluminum, wherein the first engagement structure and the second engagement structure are formed by at least one of turning and milling,
c) wherein a first circular ring segment has radius of curvature of between 10 mm and 20 mm, and a second circular ring has a radius of curvature of between 100 mm and 300 mm, and
d) wherein the first engagement structure comprises a first axially facing groove or a first axially facing projection having a first radius of curvature and the second engagement structure comprises a second axially facing groove or second axially facing projection having a second radius of curvature greater than the first radius of curvature.

9. The device according to claim 8, including a plurality of additional engagement structures equally radially spaced and configured to be brought into engagement with a plurality of projections of an adapter of workpieces of different sizes.

10. The device according to claim 8, wherein the first clamping element is produced from aluminum, wherein the first engagement structure and the second engagement structure are at least one of:
a) formed by at least one of (1) turning and (2) milling, and
b) wherein the first circular ring segment has radius of curvature of between 10 mm and 20 mm, and the second circular ring segment has a radius of curvature of between 100 mm and 300 mm.

11. The device according to claim 8, wherein the first engagement structure comprises a first axially facing groove or a first axially facing projection having a first radius of curvature and the second engagement structure comprises a second axially facing groove or second axially facing projection having a second radius of curvature greater than the first radius of curvature.

12. A device for holding a workpiece, comprising:
a first clamping element having a first axially facing groove or a first axially facing projection having a first radius of curvature and a second axially facing groove or second axially facing projection having a second radius of curvature greater than the first radius of curvature;

a second clamping element having a first axially facing groove or a first axially facing projection having the first radius of curvature and a second axially facing groove or second axially facing projection having the second radius of curvature;

wherein the first axially facing groove or the first axially facing projection of the first clamping element and the first axially facing groove or the first axially facing projection of the second clamping element are configured to receive an axial projection or an axial groove on a first workpiece and to clamp the axial projection or the axial groove when the first clamping element and the second clamping element move radially, and wherein the second axially facing groove or the second axially facing projection of the first clamping element and the second axially facing groove or the second axially facing projection of the second clamping element are configured to receive an axial projection or an axial groove of a second workpiece having a larger diameter than a diameter of the first workpiece and to clamp the axial projection or the axial groove of the second workpiece when the first clamping element and the second clamping element move radially.

* * * * *